: 3,361,714
BRANCHED POLYSILOXANES
George M. Omietanski, Tonawanda, N.Y., assignor to Union Carbide Corporation, a corporation of New York
No Drawing. Filed Apr. 29, 1963, Ser. No. 276,170
21 Claims. (Cl. 260—46.5)

This invention relates to branched polysiloxanes of specific desired compositions and to a process for their preparation employing a tertiary amine catalyst. More particularly, it relates to the production of branched polysiloxanes having superior low temperature properties in addition to having desirable high temperature properties.

Organopolysiloxane oils and elastomers are known to possess desirable high temperature properties. Their use at relatively low temperatures has been limited, however, by their relatively high freezing points or crystallization temperatures and high viscosities at low temperatures. Attempts have been made in the prior art to improve the low temperature properties of organopolysiloxane fluids and elastomers by introducing bulky groups or branches to the regular structure of the organopolysiloxane. This introduction of new groups is generally accomplished by copolymerization of monomer mixtures or equilibration techniques. The resulting branched organosiloxanes prepared by equilibration contain both long and short chains as well as cyclic network components in a random distribution. While these compounds have some improvement in the general low temperature properties, they still leave much to be desired in regard to such properties.

I have now found that branched polysiloxanes of specific desired composition having non-random, ordered structure can be prepared, which have superior low temperature properties, such as lower pour points or freezing points and lower viscosities than linear siloxanes of the same weight average molecular weight. Such materials also have high temperature properties which are equal to or better than those of linear organosiloxanes of the same bulk viscosity. These novel branched chain organosiloxanes have the generic formula:

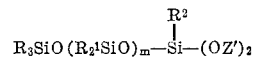

wherein R and $R^1$ are monovalent hydrocarbyl radicals, $R^2$ is a monovalent hydrocarbyl radical or substituted monovalent hydrocarbyl radical, $n$ is a number having a value of 0 to 25 inclusive, $m$ is a number having a value of 1 to 21 inclusive, $w$ is a number having a value greater than 0, $Z'$ is a monovalent radial selected from hydrogen and $R_3Si$-groups, and Z is a monovalent radical selected from the class consisting of hydroxyl and $R_3SiO$ groups. Especially useful polymers are obtained when $n$ has a value of 0 to 15 inclusive, $m$ has a value of 1 to 9 inclusive and $w$ has a value of 1 to 500 inclusive. Preferred polymers are obtained when $n$ has a value of 1 to 6 inclusive, $m$ has a value of 1 to 6 inclusive and $w$ has a value of 1 to 6 inclusive.

When $w$ is 1 and $n$ and $m$ are equal, the polymer product will have three substantially equal length branches attached to a central silicon atom through Si-O-Si linkages. The central silicon atom will also have a monovalent hydrocarbyl radical attached to it through a silicon-carbon linkage. When $w$ is 1 and $n$ and $m$ are unequal, the polymer product will have three branches attached to a central silicon atom through Si-O-Si linkages, two of which branches will be of substantially equal length and the third branch will be of different length. Here again, the central silicon atom will also have a monovalent hydrocarbyl radical attached to it through a silicon-carbon linkage. The above described polymer structures are referred to herein as "Star" polymers. When $w$ is greater than 1, the polymer product will consist of a linear organosiloxane chain having multiple $(R_2{}^1SiO)_m$ $SiR_3$ branches attached thereto through Si-O-Si linkages and where such branches are uniformly spaced along the organosiloxane chain at intervals measured by $(R_2{}^1SiO)_n$ groups. Such polymer structures are referred to herein as "Comb" polymers.

The monovalent hydrocarbyl radicals which are represented by R, $R^1$ and $R^2$ in the above formula are illustrated by alkyl groups, such as methyl, ethyl, propyl, isopropyl, butyl, isobutyl, amyl, hexyl and the like; alkenyl groups, such as vinyl, allyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethylphenyl, xylyl, mesityl and the like. R, $R^1$ and $R^2$ can be the same or different radicals and R, $R^1$ and $R^2$ are preferably methyl radicals. The substituted monovalent hydrocarbyl radicals which are represented by $R^2$ in the above formula contain chloro, amino or cyano substituents located at least two carbon atoms from the silicon atom. Such radicals are illustrated by gamma-chloropropyl, beta-aminopropyl, delta-cyanobutyl and the like.

The branched chain polysiloxanes of the present invention having superior low temperature properties can be preferably obtained by a novel process. This preparation process comprises reacting an acyloxy-siloxane having the formula:

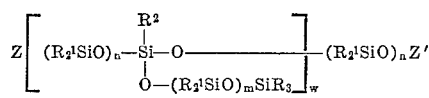

with a hydroxy-containing siloxane selected from the class consisting of organosiloxane diols having the formula $HO(R_2{}^1SiO)_nH$ and organosiloxanols having the formula $R_3Sio(R_2{}^1SiO)_nH$ in the presence of a tertiary amine, wherein R, $R^1$, $R^2$, $m$ and $n$ are defined above and $Z'$ is an acyl radical. The acyl radicals that are represented by $Z'$ in the above formula are illustrated by acetyl, propionyl, butyryl, benzoyl and the like, $Z'$ is preferably acetyl.

Tertiary amines useful in this preparation process are illustrated by triethylamine, trimethylamine, triphenylamine, methyldiethylamine, pyridine, methylethylphenylamine, 3-picoline and the like. Tertiary amines are the preferred catalysts for this preparation reaction since they do not react with acyloxy-siloxanes as do ammonia, primary and secondary amines. Tertiary amines prevent undesirable side reactions and allow specific desired products to be obtained. Ammonia can be used, if desired, in the later stages of the reaction to drive it to completion. The tertiary amines are employed in amounts in excess of that required to accept the acid formed in the reaction.

When the hydroxy-containing siloxane employed in the above preparation process is an organo-siloxane diol, the product can be a hydroxy-endblocked "Comb" polymer. Such product can be directly used for the production of organosiloxane elastomers having superior low temperature properties. If a stable organo-siloxane fluid is desired, the above hydroxy-endblocked "Comb" polymer is reacted with an organosilane having the formula $R_3SiX$ in the presence of an amine catalyst to substitute the hydroxyl end-blocking groups with $R_3SiO$-groups. X is selected from the class consisting of chloro and OZ' radicals wherein Z' is defined above. Useful catalysts in their latter endblocking reaction are amines such as ammonia, methylamine, diethylamine, pyridine, triethylamine and the like. When the hydroxy-containing siloxane employed in the above preparation process is an organo-siloxanol, the product is a "Star" polymer which is generally a fluid.

In the formation of "Comb" polymers by the above preparation process, the molecular weight of the product is controlled by the relative mole ratio of organosiloxane diol/acyloxy-siloxane. It is preferred to use an excess of the organosiloxane diol in order to form a hydroxy-endblocked product. Inert organic solvents, such as acetone, benzene, xylene and tetrahydrofuran, are preferably also used in the above preparation process to aid in the formation of the specific desired products. The preparation process conditions are not narrowly critical. An acyloxy-siloxane can be reacted with a hydroxy-containing siloxane in the temperature range of about 0° C. to about 150° C. The preferred temperature range is from about 25° C. to about 100° C. The reaction of the $R_3SiX$ end-blocker with the hydroxy-endblocked "comb" polymer employs the same general reaction conditions as described above.

In addition to the production of "Comb" polymers, the reaction between an acyloxy-siloxane and an organosiloxane diol can produce branched cyclic compounds having the formula $R_3SiO(R_2^1SiO)_mSi(R^2)O[R_2^1SiO]_a$ wherein R, $R^1$, $R^2$ and $m$ are defined above and $a$ has a value from 3 to 4 inclusive, such as $$[Me_3SiO(Me_2SiO)_3SiMeO](Me_2SiO)_3$$

"Me" designates the methyl "$CH_3$" radical. The production of such branched cyclic compounds is favored by a high dilution if inert solvent, such as those mentioned above. By "high dilution" is meant having the inert solvent present in an amount from about 25 to about 80 volume percent based on total volume of reaction mixture (includes solvent, reactants and catalyst).

The reactants in the above preparation process are prepared by well-known procedures. The $HO(R_2^1SiO)_nH$ compounds are prepared by hydrolysis of corresponding acyloxy-endblocked diorganosiloxanes. The

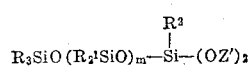

compounds are conveniently prepared by reaction between $R_3SiO(R_2^1SiO)_mH$ and $R_2Si(OZ')_3$. The $$R_3SiO(R_2^1SiO)_mH$$

compounds are conveniently prepared by hydrolysis of $R_3SiO(R_2^1SiO)_m(OZ')$ in the presence of an acid acceptor such as ammonium hydroxide, R, $R^1$, $R^2$, Z', $m$ and $n$ are defined above.

The branched chain polysiloxanes of the present invention, preferably the "Comb" polymers, can be compounded as a gum with fillers and curing catalysts employing conventional methods and then heat cured under pressure by conventional means to form elastomers having superior low temperature properties. In producing the siloxane elastomers, I can employ as curing catalysts organic peroxides such as the alkylperoxides. Especially suitable curing agents are the dialkyl peroxides which can be graphically depicted by the formulas

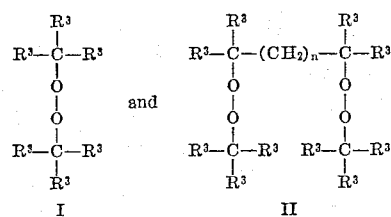

wherein $R^3$ represents the same alkyl group throughout or alkyl groups of two or more different types and $n$ is zero or a larger integer. Among the specific curing agents that I prefer to employ when the gum contains olefinically unsaturated hydrocarbon groups are included:

Di-tertiary-butyl peroxide;
Tertiary-butyl-triethylmethyl peroxide;
Tertiary-butyl-tertiary-triptyl peroxide, the composition of which is represented by the structural formula:

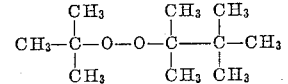

and dicumyl peroxide. Where the organosiloxane gum contains no olefinically unsaturated hydrocarbon groups it is preferred to employ organic peroxides such as dibenzoyl peroxide, 2,4-dichlorobenzoyl peroxide, tertiary-butyl perbenzoate and the like. The amount of the curing catalyst employed in producing the siloxane elastomers of this invention can be from 0.5 part catalyst per 100 parts of the siloxane gums to 5.0 parts catalyst per 100 parts gum. It is preferred to employ from 1.0 to 2.0 parts catalyst per 100 parts of the siloxane gum in order to obtain fully cured elastomers.

Among the fillers which may be employed in the production of the elastomers of this invention are inorganic fillers; for example, lithopone, ferric oxide, titanium dioxide, finely divided silica and the like; and various forms of carbon such as finely divided and colloidal carbon; for example, carbon black, such as, channel black, gas black, furnace carbon, acetylene black, and the like. The fillers may be incorporated in the elastomer in amounts ranging from 10 to 90 parts by weight filler per 100 parts by weight of the organopolysiloxane gum. It is preferred to employ the filler in amounts of from 25 to 50 parts by weight filler per 100 parts by weight of the organopolysiloxane gum.

The invention is described in further detail in the following examples.

PREPARATION OF STARTING MATERIALS $$HO(R_2^1SiO)_nH$$

Under moisture-free conditions, octamethylcyclotetrasiloxane (2072 g., 7 moles) was heated at about 100° C. with acetic anhydride (1428 g., 14 moles) for 3 hours in the presence of ferric chloride catalyst (17.5 g., 0.5 weight percent). The catalyst was deactivated by adding a slurry of 30 g. of potassium acetate in 70 ml. of acetic acid to the reaction mixture. The resulting mixture was cooled, filtered and the filtrate fractionated. In this manner acyloxy end-blocked polydimethylsiloxanes of formula $AcO(Me_2SiO)_nAc$, where "Ac" designates acyl radical and "Me" designates methyl radical, having values of $n$ up to 9 were isolated in pure form. This preparation was repeated and several of the product fractions were further identified as indicated below. In these compounds the Ac radical was an acetyl radical.

| Compound | B.P./mm. Hg | Percent AcO Calc'd | Percent AcO Found |
|---|---|---|---|
| $AcO(Me_2SiO)_2Ac$ | 106–107/10 | 36.4 | 36.2 |
| $AcO(Me_2SiO)_4Ac$ | 73/0.15 | 29.6 | 30.0 |
| $AcO(Me_2SiO)_5Ac$ | 100/0.2 | 25.0 | 25.2 |
| $AcO(Me_2SiO)_6Ac$ | 137/1.1 | 21.6 | 21.3 |

Higher molecular weight $AcO(Me_2SiO)_nAc$ fluids can be prepared by using lesser amounts of acetic anhydride.

Hydroxy-endblocked polydimethylsiloxanes were prepared by hydrolysis of the corresponding acyloxy-endblocked polydimethylsiloxanes. In general, the acyloxy-endblocked siloxane was dissolved in either acetone or tetrahydrofuran to form about a 0.25 molar solution. This solution was then treated until hydrolysis was complete with an excess of water (150–1000% over theoretical) or with ammonium hydroxide (until the mixture remained basic) at 25° C. or below. Complete hydrolysis was obtained in less than 15 minutes with ammonium hydroxide. After hydrolysis was complete, the siloxane layer was washed to neutrality and dried over anhydrous calcium sulfate. The resulting alpha-omega-polydimethylsiloxane-diols were then isolated in pure form by distillation. Several of the product fractions were further identified as indicated below.

| Compound | B.P., ° C./mm. Hg | Percent OH Calc'd | Percent OH Found |
|---|---|---|---|
| HO(Me$_2$SiO)$_3$H | 91/3 | 14.2 | 14.2 |
| HO(Me$_2$SiO)$_4$H | 94/1.0 | 10.8 | 10.7 |
| HO(Me$_2$SiO)$_5$H | 105/0.8 | 9.2 | 8.7 |
| HO(Me$_2$SiO)$_6$H | 117/0.9 | 7.7 | 7.7 |

$$R_3SiO(R_2^1SiO)_n(OAc)$$

Into a 5-liter, 3-necked flask equipped with a stirrer, thermometer and reflux condenser, were placed trimethylacetoxysilane (557 g., 4.22 moles), dimethylsiloxane cyclic trimer (1875 g., 8.43 moles), and zinc chloride (24.3 g., 1 weight percent). The reactants were heated in a constant temperature oil bath at 115° C. for 46.5 hours with vigorous stirring. The reaction mixture was then cooled, filtered and the filtrate fractionated. There was thus obtained a 41 mole percent yield (based on total moles of reactants) of Me$_3$SiO(Me$_2$SiO)$_3$Ac having B.P. 106–108°/10 mm. Hg. Analysis indicated 16.6% AcO; theory=16.6% AcO. Also obtained was a 23 mole percent yield of Me$_3$SiO(Me$_2$SiO)$_6$Ac having B.P. 95–100/0.15 mm. Hg. Analysis indicated 10.5% AcO; theory=10.2% AcO.

$$R_3SiO(R_2^1SiO)_nH$$

Hydrolysis of Me$_3$SiO(Me$_2$SiO)$_3$Ac was carried out in acetone solution (about 0.25 molar) with an excess of water (about 100%) at 0–25° C. in the presence of an acid acceptor such as ammonium hydroxide. Hydrolysis was complete in less than an hour. The product was isolated by flooding the reaction mixture with water and extracting with benzene. The benzene solution was dried over anhydrous calcium sulfate, freed from benzene and fractionated. The product, Me$_3$SiO(Me$_2$SiO)$_3$H, was obtained in better than 90 mole percent yield and had a boiling point of 70° C./2.5 mm. Hg. Analysis indicated 5.2% OH; theory=5.44% OH.

Me$_3$SiO(Me$_2$SiO)$_6$H was obtained in a similar manner. This product was obtained in 83 mole percent yield and had a boiling point of 140–142/4 mm. Hg. Analysis indicated 3.0% OH; theory=3.1% OH.

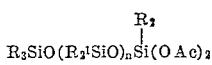

Me$_3$SiO(Me$_2$SiO)$_3$SiMe(OAc)$_2$ was prepared by slowly adding Me$_3$SiO(Me$_2$SiO)$_3$H (60 g., 0.192 moles) to a solution of MeSi(OAc)$_3$ (50 g. excess) in 50 ml. of benzene. After the exothermic reaction subsided, fractionation of the reaction mixture gave 80 g. (88 mole percent yield) of Me$_3$SiO(Me$_2$SiO)$_3$SiMe(OAc)$_2$, B.P. 103/2 mm. Hg. Analysis indicated 25.8% AcO; theory=25.0% AcO.

Similarly, Me$_3$SiO(Me$_2$SiO)$_6$SiMe(OAc)$_2$ was prepared in 85 mole percent yield by reacting $$Me_3SiO(Me_2SiO)_6H$$

with excess MeSi(OAc)$_3$. The product had a boiling point of 138° C./0.23 mm. Hg. Analysis indicated 15.0% AcO; theory=17.0% AcO.

Example I

Into a 500 ml., 3-necked flask equipped with a stirrer, thermometer, gas inlet tube, and addition funnel was charged 104.4 g. of HO(Me$_2$SiO)$_3$H and 110.0 g. of Me$_3$SiO(Me$_2$SiO)$_3$SiMe(OAc)$_2$. The charge was weighed on an analytical balance and was rinsed into the flask with a minimum amount of benzene. Triethylamine (23.8 g.) was then added slowly to the charge over a 5 minute period. Under good agitation, the reaction temperature increased from 24° C. to 51° C. Agitation was continued until the reaction temperature decreased to 25° C. (1.5 hours). Anhydrous ammonia was then bubbled into the reaction mixture for about 3 hours until no further reaction was observed. During the initial phase of the ammonia reaction, the reaction temperature became about 70° C. and a cooling bath was applied. Excess Me$_3$SiOAc (30.0 g.) was then added to the reaction mixture using anhydrous ammonia as the catalyst. The reaction temperature increased from 25° C. to 43° C. and ammonia was passed through the reaction mixture until the reaction contents reached 25° C. (3 hours). The reaction mixture was then quenched into an excess of water, the siloxane layer was washed to neutrality, dried over anhydrous calcium sulfate and devolatilized with a nitrogen sparge to 200° C. The product was cooled and filtered. The yield was about 60 mole percent of a "Comb" polymer having the formula:

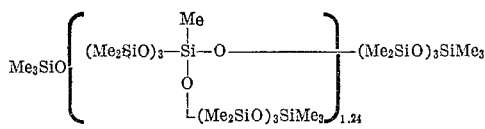

The low boiling reaction obtained in the devolatilization of the above compound was fractionated to yield a branched cyclic compound,

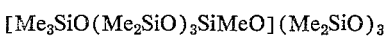

having the properties of B.P. 113–115° C./1.0 mm., Hg, $n_D^{25}$=1.3984; $d^{25°}$=0.9578. Calculated for C$_{16}$H$_{48}$O$_8$Si$_8$=molecular weight=592; molar refraction (MR$_D$)=149.1 Found: molecular weight=599, MR$_D$=149.3.

Example II

Into a 500 ml., 3-necked flask equipped with a stirrer, thermometer, gas inlet tube and addition funnel were charged 110.0 g. of Me$_3$SiO(Me$_2$SiO)$_3$SiMe(OAc)$_2$ and 48 g. of triethylamine. To the addition funnel was charged 104.4 g. of HO(Me$_2$SiO)$_3$H and approximately half of it was added to the flask during the course of an hour. A cooling bath was applied and the remainder of the diol was added while dry ammonia was passed through the reaction mixture (1.5 hours). After the addition of the diol was completed, ammonia was passed through the reaction mixture for an additional 3 hours. Then, Me$_3$SiCl (22.0 g.) was slowly added using ammonia as a catalyst (2 hours). The reaction mixture was then quenched into excess water, the siloxane layer was washed to neutrality, dried over anhydrous calcium sulfate and devolatized with a nitrogen sparge to 200° C./5 mm. Hg. The product was cooled and filtered. The yield was about 62 mole percent of a compound having the formula;

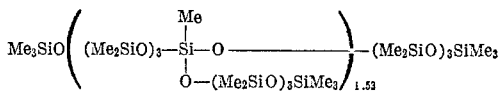

Preparations of "Comb" polymers similar to those described in Examples I and II above were repeated to form various "Comb" polymers. These branched chain polymers and some of their characteristics are listed below.

TABLE I.—MOLECULAR WEIGHT AND MOLAR REFRACTIONS OF SILICONE "COMB" POLYMERS

| Calculated Structure | $\overline{M}_n$ Calcd. | $M_n$ Obs. | $MR_D$ Calcd. | $MR_D$ Obs. |
|---|---|---|---|---|
| $M(D_3)_{2.24}D'_{1.24}M$ | 1,079 | 1,117 | 289.7 | 285.0 |
| $M(D_3)_{2.53}D'_{1.53}M$ | 1,079 | 1,293 | 333.0 | 327.8 |
| $M(D_3)_{2.96}D'_{1.96}M$ | 2,589 | 1,548 | 397.1 | 392.6 |
| $M(D_3)_{3.96}D'_{2.96}M$ | 2,589 | 2,139 | 546.2 | 541.8 |
| $M(D_3)_{4.37}D'_{3.37}M$ | 5,087 | 2,383 | 607.4 | 602.2 |
| $M(D_3)_{4.75}D'_{3.75}M$ | 5,087 | 2,607 | 664.0 | 657.1 |
| $M(D_5)_{2.98}D'_{1.98}M$ | 2,326 | 2,000 | 515.2 | 507.6 |
| $M(D_5)_{3.52}D'_{2.52}M$ | 3,017 | 2,400 | 611.8 | 608.2 |
| $M(D_6)_{2.10}D'_{1.10}M$ | 1,079 | 1,500 | 384.2 | 381.6 |
| $M(D_6)_{2.80}D'_{1.80}M$ | 2,589 | 2,072 | 527.0 | 523.3 |
| $M(D_6)_{6.02}D'_{5.02}M$ | 2,589 | 4,700 | 1,184.0 | 1,182.5 |
| $M(D_6)_{6.61}D'_{5.64}M$ | 5,087 | 5,200 | 1,310.5 | 1,307.7 |
| $M(D_3)_{2.41}D''_{1.44}M$ | 1,079 | 1,557 | 379.6 | 394.5 |
| $M(D_6)_{2.135}D''_{1.135}M$ | 1,079 | 1,783 | 451.7 | 451.2 |

*$D' = MD_3T$.
**$D'' = MD_6T$.
$T=MeSiO_{3/2}$; $M=Me_3SiO_{1/2}$; $D=Me_2SiO$; $\overline{M}_n$=number average molecular weight.

The calculated molar refractions ($MR_D$) and the calculated structures are based on the observed molecular weights. The observed molecular weights were obtained using the vapor pressure osmometer.

*Example III*

The reaction was carried out in a 3-necked flask equipped with a stirrer, thermometer, addition funnel and gas inlet tube. Triethylamine (45.0 g.) was added slowly with stirring to a solution of $$Me_3SiO(Me_2SiO)_3SiMe(OAc)_2$$

(70 g.) and $HO(Me_2SiO)_4H$ (46.5 g.) in benzene (469.0 g.). After the addition of the triethylamine was completed in about 20 minutes, the reaction mixture was heated and maintained at 80° C. for about 17 hours. The reaction mixture was then cooled and additional 300 g. of benzene was added, and dry ammonia was bubbled through the reaction mixture for about 3 hours. The reaction mixture was then filtered and the filtrate stripped of solvent and fractionated. There was obtained about 25 g. (26 mole percent) yield of a branched cyclic pentamer having the formula $[Me_3SiO(Me_2SiO)_3SiMeO](Me_2SiO)_4$. It had the properties of B.P. 140–142° C./2.0 mm. Hg $n^{25}=1.3987$; $d^{25°}=0.9614$. Calculated: molecular weight=666, $MR_D=168.7$. Found: molecular weight=665, $MR_D$ 167.4.

*Example IV*

In a 500 ml., 3-necked flask equipped with a stirrer, addition funnel and gas inlet tube were placed $$Me_3SiO(Me_2SiO)_3SiMe(OAc)_2$$

(116 g., 0.245 mole) and triethylamine (80 g., excess). The compound $Me_3SiO(Me_2SiO)_3H$ (160 g., excess) was then slowly added over a period of 0.5 hour from the addition funnel, followed by the addition of an excess of ammonia through the gas inlet tube. After cooling, the reaction mixture was quenched into distilled water, the siloxane layer was separated, dried over anhydrous calcium sulfate and fractionated. There was obtained 120 g. (50 mole percent yield) of $[Me_3SiO(Me_2SiO)_3]_3SiMe$ having a boiling point 165°/0.2 mm. Hg. Calculated for $C_{28}H_{84}O_{12}Si_{13}$: 34.4% C, 8.7% H, 37.3% Si, $MR_D=254.0$, mol. wt. 978. Found: 34.2% C, 8.8% H, 37.0% Si, $MR_D=254.0$, mol. wt. 987.

*Example V*

In a manner similar to that described above in Example IV, $Me_3SiO(Me_2SiO)_3Si(C_6H_5)(OAc)_2$ was reacted with $Me_3SiO(Me_2SiO)_3H$ in the presence of triethylamine to form a compound having the formula $$[Me_3SiO(Me_2SiO)_3]_3SiC_6H_5.$$

This "star" polymer product had the properties of B.P. 178° C./0.08 mm. Hg; $n_D^{25}=1.4162$. Calculated for $C_{33}H_{86}O_{12}Si_{13}$: 38.2% C, 8.3% H, 35.1% Si, $MR_D=273.8$, molecular weight=1038. Found: 38.3% C, 8.2% H, 35.1% Si, $MR_D=274.0$, molecular weight=1032.

The most important single property of branched siloxane polymers is their extremely low pour points or freezing points. This property appreciably extends the service temperature range of these materials. The pour points were obtained with a modified Beckman freezing point apparatus. The apparatus provided for liquid nitrogen as the coolant, a constant purge of argon over the sample, insertion of the thermocouple directly in the sample, and vigorous agitation of the sample by means of a hand operated wire stirrer. Pour points were determined on the fluids by continuously stirring the samples as they cooled, and taking temperature versus time readings at 1 minute intervals. In the region of the pour point, 30 sec. intervals were employed. The plateau on the time-temperature plot was taken as the lower limit of the pour point. At this temperature the fluid could no longer be stirred. At least two cooling curves were run on each sample together with a melting curve determination to eliminate supercooling effects. The pour points of novel branched siloxane fluids and linear siloxane fluids which served as controls are given in Table II below. Generally, the data shows that the pour points of the novel branched fluids are about 40–50° F. lower than those of linear dimethylsiloxane fluids of comparable molecular weight or comparable 25° C. bulk viscosity. The best pour points are obtained with the most highly branched dimethylsiloxane fluids of low molecular weight.

TABLE II.—POUR POINTS OF BRANCHED SILICONE FLUIDS

| Structure | Pour Point, ° F. | Viscosity, 25° C. cs. |
|---|---|---|
| $M(D_3)_{2.21}D_{1.24}M$ "Comb type" | −139 | 13.38 |
| $M(D_3)_{2.53}D_{1.53}M$ | −136 | 14.13 |
| $M(D_3)_{2.96}D_{1.96}M$ | −133 | 17.44 |
| $M(D_3)_{3.96}D_{2.96}M$ | −141 | 27.27 |
| $M(D_3)_{4.37}D_{3.37}M$ | −127 | 41.16 |
| $M(D_3)_{4.75}D_{3.75}M$ | −122 | 42.10 |
| $M(D_5)_{2.98}D_{1.98}M$ | −135 | 20.21 |
| $M(D_5)_{3.52}D_{2.52}M$ | −135 | 27.51 |
| $M(D_6)_{2.10}D_{1.10}M$ | −130 | 21.40 |
| $M(D_6)_{2.80}D_{1.80}M$ | −128 | 31.18 |
| $M(D_6)_{6.02}D_{5.02}M$ | −122 | 73.05 |
| $M(D_6)_{6.61}D_{5.64}M$ | −126 | 135.30 |
| $M(D_3)_{2.4}D_{1.44}M$ | −140 | 17.29 |
| $M(D_6)_{2.135}D_{1.135}M$ | −135 | 25.88 |
| $[MD_3]_3T$ "Star type" | −158 | 6.50 |
| $(MD_3)_3SiC_6H_5$ | −139 | 9.0 |
| $(MD_3T)D_3$ "Branched Cyclic" | −140 | 5.58 |
| $(MD_3T)D_4$ | −148 | 7.12 |
| $(MD-M)$ Control | ***−80 | 20.0 |
| $MD-M$ Control | ***−120 | 7.0 |

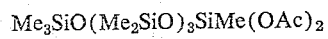

*$D_1=MD_3T$.
**$D''=MD_6T$.
***Fluids supercooled, values are melting points.
$T=MESiO_{3/2}$; $D=Me_2SiO$; $M=Me_3SiO_{1/2}$.

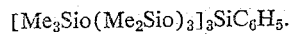

The low temperature properties of the novel branched siloxane polymers are also superior when time at temperature is considered. A comb polymer having the formula $M(D_6)_{2.10}(MD_3T)_{1.10}M$ was still fluid after 18 days at −100° F. but a 20 cstks., linear dimethylsiloxane oil crystallized within 3 days. At −139° F., the 20 cstks. linear fluid crystallized within an hour.

Blends of novel branched siloxane polymers and linear siloxane fluids also show excellent low temperature properties, particularly at higher branched fluid concentrations. For example, a 10 cstks. linear dimethylsiloxane fluid crystallized within 0.5 hr. at −139° F., but a 50/50 weight percent blend of this fluid with a branched chain comb polymer of formula $M(D_3)_{2.24}(MD_3T)_{1.24}M$ was still fluid after 7 hours at −139° F.

The novel branched siloxanes also have high temperature properties which are comparable to linear siloxane fluids. Branched fluids in the 2000 molecular weight (number average) range had flash points of 465–535° F. A fully stabilized linear dimethylsiloxane fluid has a flash point under similar conditions of about 500° F. in this molecular weight range.

The novel branched organopolysiloxanes of the present invention can be used in any manner similar to prior organopolysiloxanes, such as lubricating oils and elastomers for gaskets and the like. In addition to such prior art utility, the present novel compositions have superior low temperature properties which greatly extends the utility of the fluids and elastomers prepared therefrom to such low temperatures.

Utility for the branched chain organopolysiloxanes of the present invention is shown by the following example.

*Example VI*

The thermal condensation reaction of

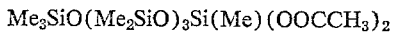
$Me_3SiO(Me_2SiO)_3Si(Me)(OOCCH_3)_2$ with a stoichiometric equivalent of $HO(Me_2SiO)_nH$ where $n$ is about 76 (0.3 weight percent OH) gave a slightly sticky and crosslinked copolymer which contained about 0.6 mole percent of $Me_3SiO(Me_2SiO)_3SiMeO_{3/2}$ pendent units. This copolymer was prepared by the following heating schedule: 200° C./760 mm. Hg for 3 hr.; 180° C./5 mm. Hg for 6 hr.; 180° C./1 mm. Hg for 6 hr.; and 250° C./1 mm. Hg for 6 hr. The copolymeric gum was compounded in a mixture consisting of 100 parts by weight gum, 40 parts by weight finely divided silica filler, 2 parts by weight $Fe_2O_3$ stabilizer, and 2 parts by weight benzoyl peroxide curing catalyst. This mixture was then placed in a mold and heated to 240° F. for 15 min. The mold cured elastomer product was post cured at 480° F. for 24 hours. The physical properties of the elastomer product are listed below. There appeared to be no loss of physical properties due to rearrangement of pendent siloxane groups during post curing.

TABLE III

| Properties | Mold Cure | Post Cure |
|---|---|---|
| Hardness (Shore A) | 70 | 72 |
| Elongation (Percent) | 150 | 125 |
| Tensile, p.s.i. | 530 | 575 |
| Permanent Set (Percent) | 0 | 0 |

This elastomer had a Gehman freezing point of −76° F. In comparison, a pure dimethylsiloxane elastomer has a Gehman freezing point of −57° F.

What is claimed is:

1. Branched organosiloxanes with superior low temperature properties selected from the class consisting of (1) branched chain organosiloxanes having the formula:

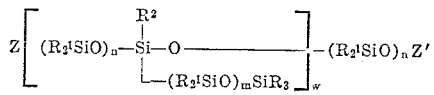

wherein R and $R^1$ are monovalent hydrocarbyl radicals, $R^2$ is selected from the class consisting of monovalent hydrocarbyl radicals and substituted monovalent hydrocarbyl radicals, that contain a chloro, amino or cyano substituent located at least two carbons from the silicon atom, $n$ is a number having a value of 0 to 25 inclusive, $m$ is a number having a value of 1 to 21 inclusive, $w$ is a number having a value from 1 to 6, $Z'$ is a monovalent radical selected from the class consisting of hydrogen and $R_3Si$ groups, and Z is a monovalent radical selected from the class consisting of hydroxyl and $R_3SiO$ groups, and (2) branched cyclic organosiloxanes having the formula:

wherein R, $R^1$, $R^2$ and $m$ are defined above and $a$ is a number having a value from 3 to 4 inclusive.

2. An organosiloxane as defined in claim 1 which is a liquid.

3. An organosiloxane as defined in claim 1 which is a liquid having a viscosity from 7.0 to 135.3 centistokes at 25° C.

4. Branched chain organosiloxanes with superior low temperature properties having the formula:

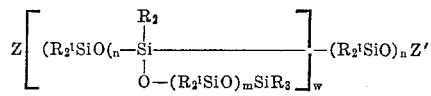

wherein R and $R^1$ are monovalent hydrocarbyl radicals, $R^2$ is selected from the class consisting of monovalent hydrocarbyl radicals and substituted monovalent hydrocarbyl radicals, that contain a chloro, amino, or cyano substituent located at least two carbon atoms from the silicon atom, $n$ is a number having a value of 0 to 25 inclusive, $m$ is a number having a value of 1 to 21 inclusive, $w$ is a number having a value from 1 to 6, $Z'$ is a monovalent radical selected from the class consisting of hydrogen and $R_3Si$ groups, and Z is a monovalent radical selected from the class consisting of hydroxyl and $R_3SiO$ groups.

5. Branched chain organosiloxanes as set forth in claim 4 wherein $n$ has a value of 0 to 15 inclusive, m has a value of 1 to 9 inclusive and $w$ has a value of 1 to 500 inclusive.

6. Branched chain organosiloxanes as set forth in claim 4 wherein $n$ has a value of 1 to 6 inclusive, m has a value of 1 to 6 inclusive and $w$ has a value of 1 to 6 inclusive.

7. Comb branched chain organosiloxanes as set forth in claim 4 wherein $w$ has a value greater than 1.

8. Star branched chain organosiloxanes as set forth in claim 4 wherein $w$ has a value of 1.

9. An organosiloxane as defined in claim 4 which is a liquid having a viscosity from 7.0 to 135.3 centistokes at 25° C.

10. Branched chain organosiloxane having the formula:

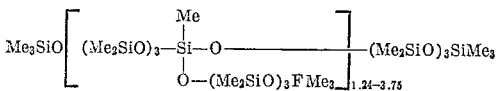

11. Branched chain organosiloxane having the formula:

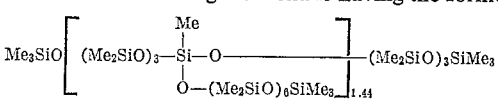

12. Branched chain organosiloxane having the formula:

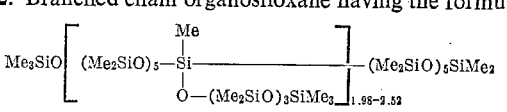

13. Branched chain organosiloxane having the formula:

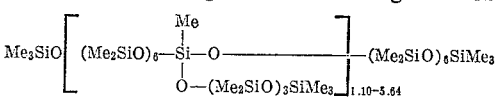

14. Branched chain organosiloxane having the formula:

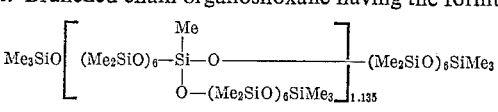

15. Branched chain organosiloxane having the formula:

$[Me_3SiO(Me_2SiO)_3]_3SiMe$

16. Branched chain organosiloxane having the formula:

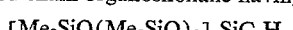
$[Me_3SiO(Me_2SiO)_3]_3SiC_6H_5$

17. Branched cyclic organosiloxanes with superior low temperature properties having the formula:

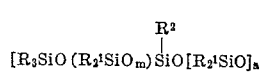

wherein R and $R^1$ are monovalent hydrocarbyl radicals, $R^2$ is selected from the class consisting of monovalent hydrocarbyl radicals and substituted monovalent hydrocarbyl radicals that contain a chloro, amino, or cyano substituent located at least two carbon atoms from the silicon atom, $m$ is a number having a value of 1 to 21 inclusive and $a$ is a number having a value from 3 to 4 inclusive.

18. An organosiloxane as defined in claim 17 which is a liquid having a viscosity from 7.0 to 135.3 centistokes at 25° C.

19. Branched cyclic organosiloxane having the formula:

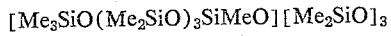
[Me$_3$SiO(Me$_2$SiO)$_3$SiMeO][Me$_2$SiO]$_3$

20. Branched cyclic organosiloxane having the formula:

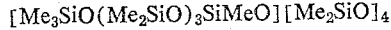
[Me$_3$SiO(Me$_2$SiO)$_3$SiMeO][Me$_2$SiO]$_4$

21. A heat-curable elastomer forming composition comprising (1) a branched chain organosiloxane having the formula:

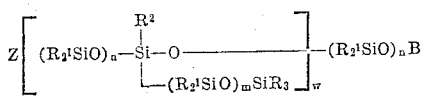

wherein R and R$^1$ are monovalent hydrocarbyl radicals, R$^2$ is selected from the class consisting of monovalent hydrocarbyl radicals and substituted monovalent hydrocarbyl radicals that contain a chloro, amino, or cyano substituent located at least two carbon atoms from the silicon atom, $n$ is a number having a value of 0 to 25 inclusive, $m$ is a number a value of 1 to 21 inclusive, $w$ is a number having a value greater than 0, B is a monovalent radical selected from the class consisting of hydrogen and R$_3$Si groups, and Z is a monovalent radical selected from the class consisting of hydroxyl and R$_3$SiO groups, (2) a filler and (3) an organic peroxide.

References Cited

UNITED STATES PATENTS

| | | | |
|---|---|---|---|
| 3,077,465 | 2/1963 | Bruner | 260—448.8 |
| 3,105,061 | 9/1963 | Bruner | 260—448.8 |
| 3,234,175 | 2/1966 | Pike | 260—46.5 |
| 3,271,360 | 9/1966 | Williams | 260—46.5 |

DONALD E. CZAJA, *Primary Examiner.*

LEON J. BERCOVITZ, *Examiner.*

M. I. MARQUIS, *Assistant Examiner.*